United States Patent
Hsieh et al.

(10) Patent No.: US 8,246,174 B2
(45) Date of Patent: Aug. 21, 2012

(54) PROJECTOR WITH LENS HEIGHT ADJUSTING FUNCTION

(75) Inventors: Ming-Chih Hsieh, Taipei Hsien (TW); Tsung-Hsi Li, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 355 days.

(21) Appl. No.: 12/750,685

(22) Filed: Mar. 30, 2010

(65) Prior Publication Data
US 2011/0222028 A1 Sep. 15, 2011

(30) Foreign Application Priority Data
Mar. 10, 2010 (TW) .............................. 99106860 A

(51) Int. Cl.
*G03B 21/14* (2006.01)
(52) U.S. Cl. ............................ 353/70; 353/101; 353/119
(58) Field of Classification Search ................... 353/70, 353/100, 101, 119
See application file for complete search history.

(56) References Cited

U.S. PATENT DOCUMENTS

| | | | |
|---|---|---|---|
| 2002/0154278 A1* | 10/2002 | Masuda | 353/101 |
| 2005/0088631 A1* | 4/2005 | Dwyer et al. | 353/101 |
| 2006/0164612 A1* | 7/2006 | Chen et al. | 353/119 |
| 2006/0209272 A1* | 9/2006 | Ishino | 353/119 |
| 2008/0013056 A1* | 1/2008 | Tsuboi | 353/119 |
| 2011/0222027 A1* | 9/2011 | Hsieh et al. | 353/101 |
| 2011/0235002 A1* | 9/2011 | Hsieh et al. | 353/101 |

* cited by examiner

*Primary Examiner* — William C Dowling
(74) *Attorney, Agent, or Firm* — Altis Law Group, Inc.

(57) ABSTRACT

A projector includes a projector body, a lens module, and a base rack. The front panel of the projector body defines a though hole. The lens module includes a lens body rotatably mounted to the projector body, a sliding bracket, and a lens extending from the lens body to extend through the through hole of the projector body, and a sliding bracket connected to the lens body via parallel connecting poles. The sliding bracket is slidably mounted to the base rack. The base rack is rotatably mounted to the projector body. A height of the lens is operable to be adjusted by changing the positions of the sliding bracket on the base rack.

6 Claims, 4 Drawing Sheets

PROJECTOR WITH LENS HEIGHT ADJUSTING FUNCTION

BACKGROUND

1. Technical Field

The present invention relates to projectors, and particularly, to a projector which can adjust the height of a lens of the projector conveniently.

2. Description of Related Art

Projectors are used very widely in a lot of places, such as offices, homes, etc. Some times, users need to heighten up a height of a lens of a projector to make a height of the projecting image from the lens match a projected screen. However, when the height of the lens is heightened up to a certain angle, the image on the projected screen may be distorted because the angle of the lens is changed correspondingly, which may influence projected impression.

DETAILED DESCRIPTION

Figure 1:
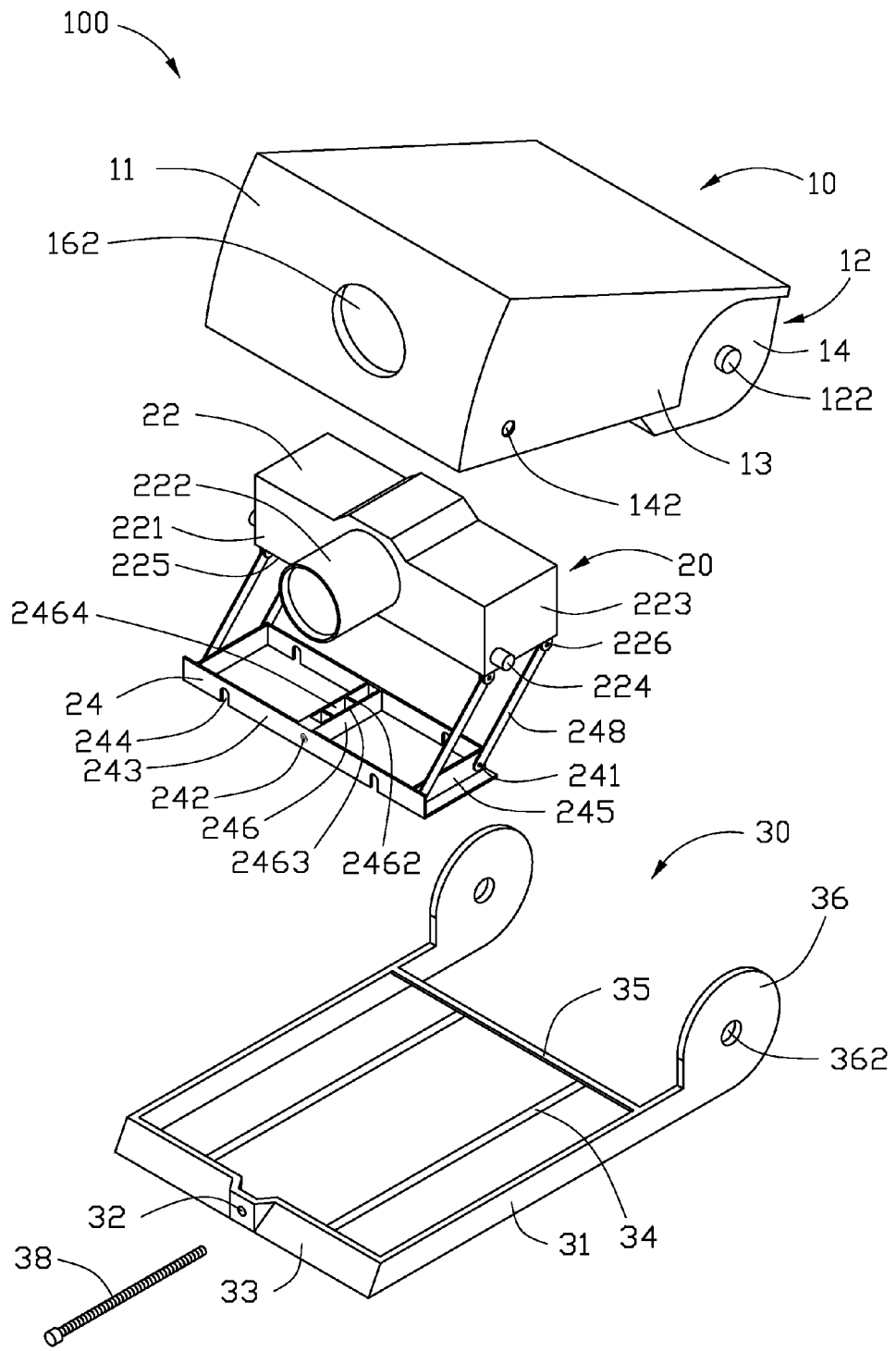
FIG. 1 is an exploded, isometric view of an exemplary embodiment of a projector.

Referring to FIG. 1, an embodiment of a projector 100 includes a projector body 10, a lens module 20 including a lens 222, and a base rack 30.

The projector body 10 is approximately rectangular-shaped. A front panel 11 of the projector body 10 defines a through hole 162 for receiving the lens 222. A diameter of the through hole 162 is little greater than a diameter of the lens 222. Two opposite sidewalls 13 of the projector body 10 each define a through hole 142. A rear of the projector body 10 includes a rotating portion 12 whose length is little shorter than the width of the projector 10, with a groove 14 bounded by a portion of the projector body 10 at each sidewall 13 and the rotating portion 12. Two rotating post 122 extend from opposite sides of the rotating portion 12, toward the corresponding grooves 14. It may be understood that the projector body 10 also includes other function elements, such as a power module, and a control module for example. These other function elements fall within well-known technologies, and are therefore not described here.

The lens module 20 includes a lens body 22 and a sliding bracket 24 connected to the lens body 22. The lens 222 extends from a front wall 221 of the lens body 22. Two opposite sidewalls 223 of the lens body 22 each include a post 224 corresponding to the through holes 142 of the projector body 10. Four first connection elements 226 extend from four corners of a bottom 225 of the lens body 22. Each first connection element 226 may include two parallel half-round connection portions (not labeled) each defining a through hole (not labeled). In other embodiments, the first connection elements 226 can be designed in different constructions.

The sliding bracket 24 is an approximately rectangle frame including two parallel long sidewalls 243 and two parallel short sidewalls 245 to form the rectangle frame. Two second connection elements 241 extend from each short sidewall 245 outside of the sliding bracket 24, corresponding to the first connection elements 226. A first end of a pole 248 rotatably connects to a corresponding first connection element 226. A second end of the pole 248 opposite to the first end rotatably connects to a corresponding second connection element 241. The poles 248 of the lens module 20 are parallel to one another. Each long sidewall 243 defines two U-shaped openings 244, adjacent to the short sidewalls 245, and defines a screw hole 242 in a center of the long sidewall 243. The spaced sliding bracket 24 further includes two parallel beams 246 connected between centers of the two long sidewalls 243 and parallel to the short sidewalls 245. A space 2464 is bounded by the two parallel beams 246 and the long sidewalls 243. A plurality of parallel boards 2462 vertically connect between the beams 246. Each board 2462 defines a screw hole 2463 corresponding to the screw hole 242.

The base rack 30 is an approximately rectangle frame including two parallel long sidewalls 31, a front sidewall 33, and a back sidewall 35 to form the rectangle frame. A through hole 32 is defined in a center of the front sidewall 33 corresponding to the screw hole 242 of the sliding bracket 24 of the lens module 20. Two parallel slide bars 34 perpendicularly connect between the front sidewall 33 and the back sidewall 35. Two round rotating portions 36 extend from back ends of the two sidewalls 31, respectively, adjacent to the back sidewall 35. Each rotating portion 36 defines a through hole 362 corresponding to the rotating post 122 of the projector body 10.

Figure 2:
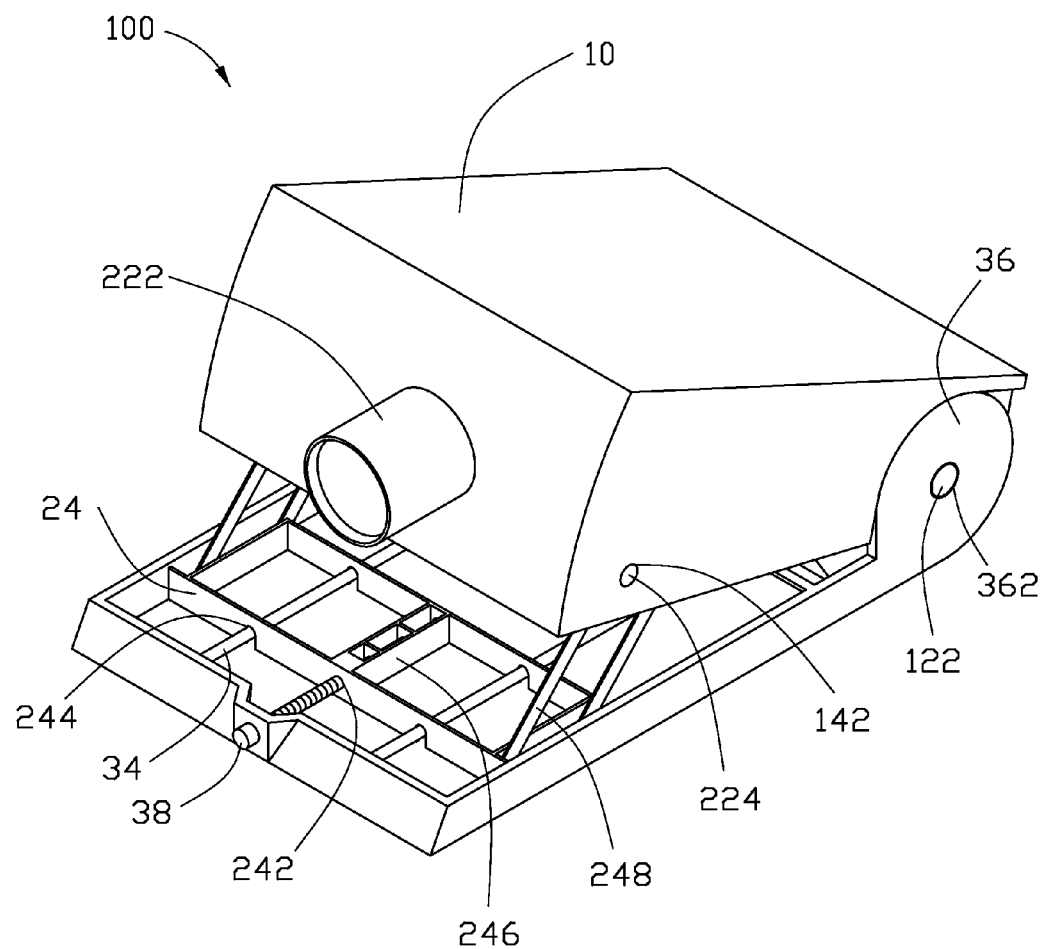
FIG. 2 is an assembled view of the projector of FIG. 1, in a first situation.
Figure 3:
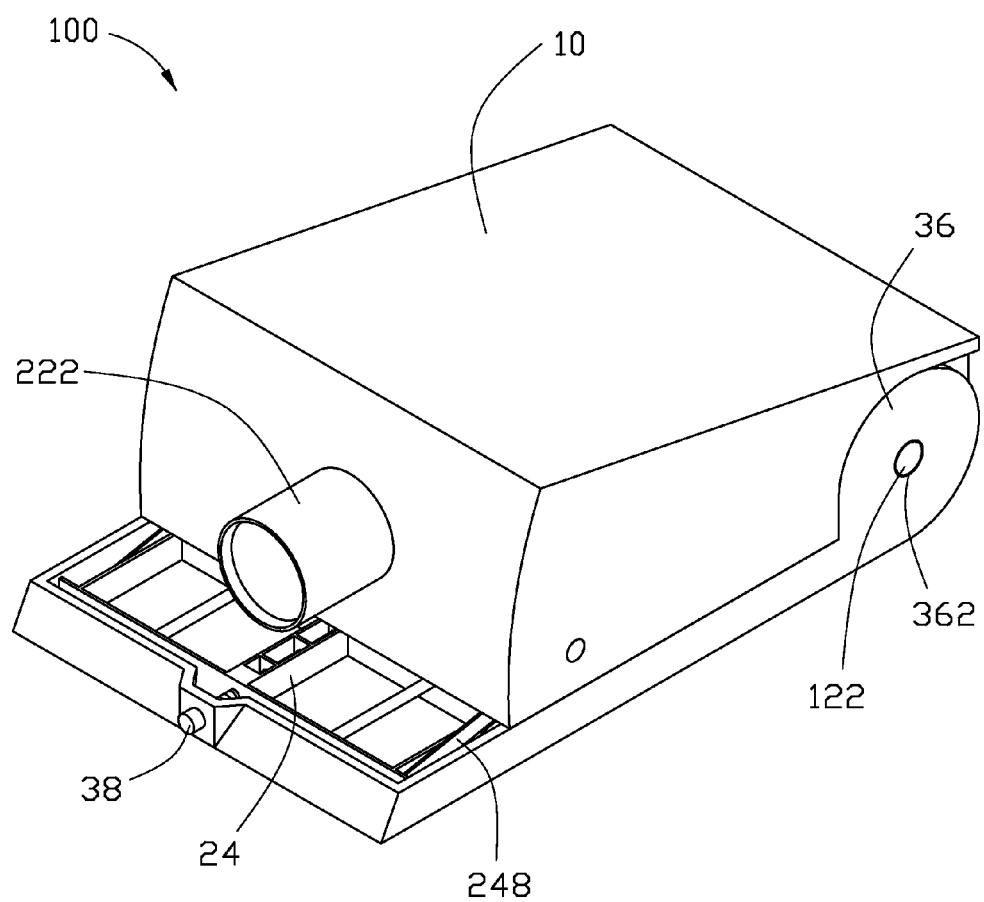
FIG. 3 is similar to FIG. 2, but in a second situation.
Figure 4:
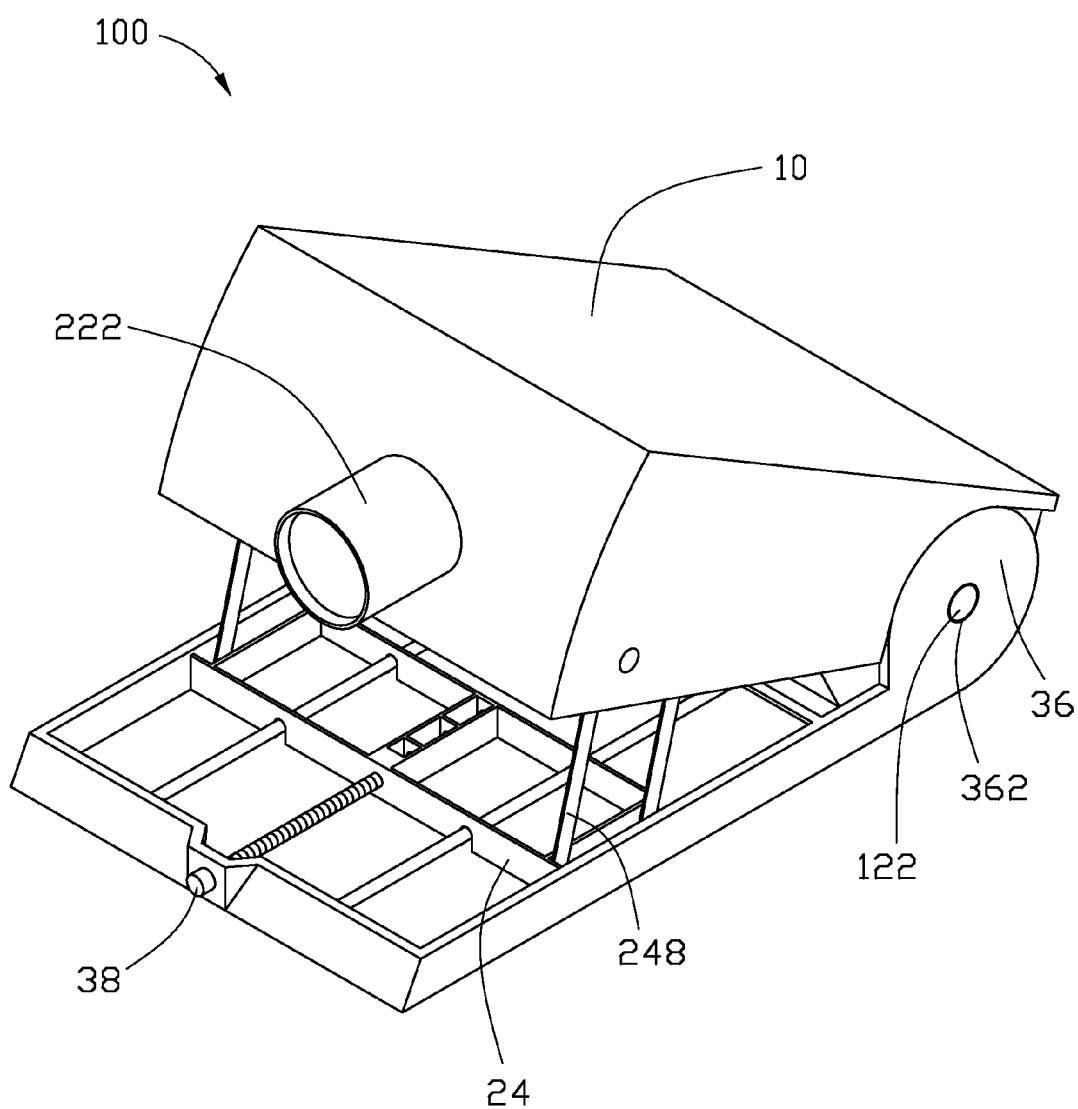
FIG. 4 is similar to FIG. 2, but in a third situation.

Referring to FIGS. 2-4, in assembly, the sliding bracket 24 is positioned in the base rack 30, with the two slide bars 34 located in the openings 244, which can block the sliding bracket 24 to move along the direction of the short sidewalls 245. The lens 222 is inserted into the through hole 162 and exposed outside the projector body 10. The posts 224 of the lens module 20 are inserted into the through holes 142 of the projector body 10. The rotating posts 122 of the projector body 10 are inserted into the through holes 362 of the base rack 30. A bolt 38 is inserted into the through hole 32 of the base rack 30, and then screwed into the screw hole 242 and the following screw holes 2463 of the sliding bracket 24. In use, the sliding bracket 24 can slide along the slide bars 34 to be positioned on different places in the base rack 30 along a direction parallel to the long sidewalls 31, by rotating the screw 38. During the process of the sliding bracket 24 sliding, the poles 248 rotate about the first and second connection elements 226 and 241, with the bottom 225 of the lens body 22 parallel to the sliding bracket 24, to adjust a distance between the lens body 22 and the sliding bracket 24, thereby adjust a height of the lens 222. FIG. 2 shows a first status in which the sliding bracket 24 is nearest to the front sidewall 33, FIG. 4 shows a second status in which the sliding bracket 24 is farthest from the front sidewall 33, FIG. 3 shows a third status in which the sliding bracket 24 is at a middle place between the first and second statuses. Therefore, the height of the lens 222 is adjusted by rotating the screw 38. Furthermore, because the bottom 225 of the lens body 22 is always parallel to the base rack 30, an angle between the lens 222 and the base rack 30 will not be changed anytime, which can assure projected impression.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A projector comprising:
a projector body comprising a front panel and two sidewalls connected to opposite ends of the front panel, the front panel defining a first though hole;
a lens module comprising a lens body, a lens extending from the lens body, a sliding bracket, and a plurality of parallel poles having same lengths, the lens body rotatably mounted to a front of the projector body and between the sidewalls of the projector body, the lens extending through the first through hole of the projector body, first ends of the plurality of poles rotatably connected to the lens body, second ends of the plurality of poles rotatably connected to the sliding bracket; and
a base rack rotatably mounted on a rear of the projector body, wherein the sliding bracket is slidably mounted on the base rack and is operable to be positioned in different positions of the base rack, wherein a height of the lens is operable to be adjusted by changing the positions of the sliding bracket on the base rack.

2. The projector of claim 1, wherein the projector body is rectangular-shaped, the sidewalls of the projector body define two pivot holes, the lens module further comprises two posts extending from opposite ends of the lens body to rotatably engage in the pivot holes of the projector body.

3. The projector of claim 1, wherein two posts extend from two opposite sides of the rear of the projector body, a rear of the base rack defines two pivot holes rotatably engaged in the two posts of the projector body.

4. The projector of claim 1, wherein the sliding bracket is an approximately rectangle frame comprising two parallel long sidewalls and two parallel short sidewalls to form the rectangle frame, two connection elements extend from each short sidewall outside of the sliding bracket to rotatably connect to the second ends of the plurality of poles.

5. The projector of claim 4, wherein, each long sidewall defines two openings and a first screw hole between the openings, the sliding bracket further comprises two parallel beams connected between the two long sidewalls and parallel to the short sidewalls, the two parallel beams and the long sidewalls bound a space, with a plurality of parallel boards perpendicularly connected between the beams, each board defines a second screw hole corresponding to the first screw hole, a bolt is inserted into the base rack and then screwed into the first and second screw holes, the sliding bracket is operable to slidably move from one position to another position in the base rack by rotating the bolt.

6. The projector of claim 5, wherein the base rack is an approximately rectangle frame comprising two parallel long sidewalls, a front sidewall, and a back sidewall to form the rectangle frame, a second through hole is defined in the front sidewall for the bolt extending through, two parallel slide bars perpendicularly connect between the front sidewall and the back sidewall, the sliding bracket is positioned on the base rack, with the two slide bars accommodated in the openings.

* * * * *